US008843267B2

United States Patent
Park et al.

(10) Patent No.: US 8,843,267 B2
(45) Date of Patent: Sep. 23, 2014

(54) WHEEL LOCALIZER, WHEEL LOCALIZATION DEVICE, SYSTEM, METHOD AND COMPUTER PROGRAM FOR LOCATING A POSITION OF A WHEEL

(71) Applicant: Infineon Technologies AG, Neubiberg (DE)

(72) Inventors: Joo Il Park, Sungnam (KR); Thomas Lange, Munich (DE); Karine Pillet, Munich (DE); Myungkil Kim, Gwangmyeong (KR)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/738,502

(22) Filed: Jan. 10, 2013

(65) Prior Publication Data

US 2014/0195107 A1 Jul. 10, 2014

(51) Int. Cl.
*G06F 7/00* (2006.01)
*B60C 23/04* (2006.01)

(52) U.S. Cl.
CPC ......... *B60C 23/0416* (2013.01); *B60C 23/0489* (2013.01); *B60C 23/0488* (2013.01); *B60C 23/0459* (2013.01)
USPC ............................................ 701/34.4; 701/36

(58) Field of Classification Search
CPC ............ B60C 12/0416; B60C 23/0488; B60C 23/0489; B60C 23/0471; G01M 17/013
USPC ........ 701/34.4, 48, 30.5, 30.7–30.9, 31.1, 46; 340/447, 442
See application file for complete search history.

(56) References Cited

U.S. PATENT DOCUMENTS

| 4,651,290 | A | * | 3/1987 | Masaki et al. ................... 701/80 |
| 4,761,741 | A | * | 8/1988 | Agarwal et al. ................. 701/78 |
| 5,099,443 | A | * | 3/1992 | Higashimata et al. ........ 702/141 |
| 2001/0029423 | A1 | * | 10/2001 | Nishida et al. .................. 701/89 |
| 2003/0058118 | A1 | | 3/2003 | Wilson |
| 2005/0065693 | A1 | * | 3/2005 | Wang et al. ..................... 701/70 |
| 2010/0256874 | A1 | * | 10/2010 | Carresjo et al. ................. 701/48 |
| 2010/0274441 | A1 | * | 10/2010 | Carresjo ......................... 701/33 |
| 2010/0274607 | A1 | | 10/2010 | Carresjo et al. |
| 2011/0071737 | A1 | | 3/2011 | Greer et al. |
| 2011/0271745 | A1 | * | 11/2011 | Oshiro .............................. 73/49 |
| 2012/0029767 | A1 | | 2/2012 | Bailie et al. |
| 2013/0166140 | A1 | | 6/2013 | Steiner |

FOREIGN PATENT DOCUMENTS

WO 2006100577 A1 9/2006

* cited by examiner

*Primary Examiner* — Marthe Marc-Coleman
(74) *Attorney, Agent, or Firm* — Eschweiler & Associates, LLC

(57) ABSTRACT

Embodiments can provide a system, a wheel localizer, a wheel localization device, a method or a computer program for locating a position of wheel and/or for determining an acceleration of a wheel of a vehicle. The system for locating a position of at least one out of a plurality of wheels of a vehicle includes a detector configured to obtain information related to a tangential acceleration of the at least one wheel of the vehicle and an antilock braking system unit configured to obtain information related to angular rotations of the plurality of wheels. The system further includes a locator configured to determine the position of the at least one wheel based on the information related to the tangential acceleration of the at least one wheel and the information related to the angular rotations of the plurality of wheels.

28 Claims, 9 Drawing Sheets

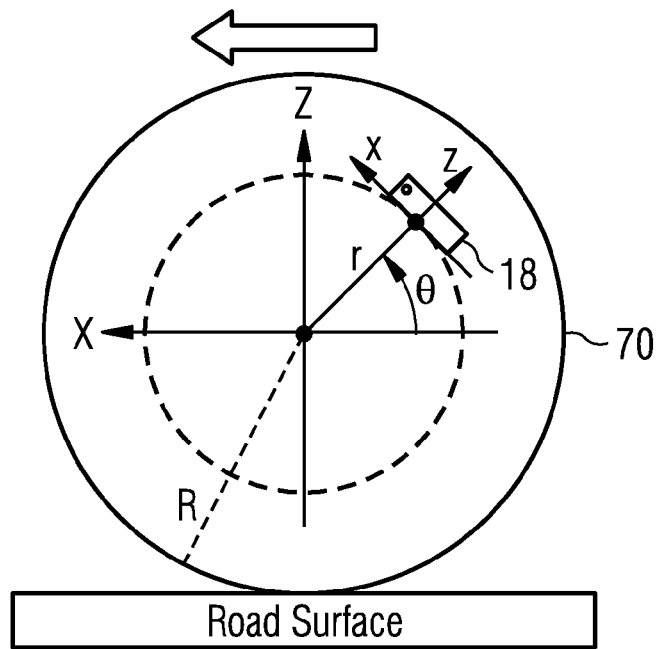

FIG 9

Longitudinal motion direction

Road Surface

Symbol definition r : radius from center to sensor
R : Tire Radius
g : gravity
$\theta$ : CCW-direction angle from X-axis
$\dot{\omega}$ : $d\omega / dt$ (Angular acceleration)
$\omega$ : $d\theta / dt$ (Angular speed)
X, Z : Vehicle coordinate
x, z : Sensor coordinate
Ax : Tangential direction (x-axis) acceleration
Az : Radial direction (z-axis) acceleration

WHEEL LOCALIZER, WHEEL LOCALIZATION DEVICE, SYSTEM, METHOD AND COMPUTER PROGRAM FOR LOCATING A POSITION OF A WHEEL

FIELD

Embodiments of the present disclosure relate to a wheel localizer, a wheel localization device, a method, a system and a computer program for locating a position of a wheel and/or for determining an acceleration of a wheel of a vehicle.

BACKGROUND

Tire Pressure Monitoring Systems (TPMS) are designed to monitor the air pressure inside of pneumatic tires on various types of vehicles. Therefore pressure sensors are used in the tires and the system may report the tire pressure information to the driver of the vehicle. Wireless transmission can be used to transmit information on the pressure data to a centralized receiver component in the vehicle. Such a configuration can enable the system to report or signal pressure losses of the tires to the driver. Some known TPMS provide localization information on the tire or wheel on top of pressure information so as to indicate to a driver of a vehicle the position of a wheel having a pressure loss. Examples are indications on whether a pressure loss of a tire of a wheel of a car is on the Front Left (FL) tire, the Front Right (FR) tire, the Rear Left (RL) tire, and/or the Rear Right (RR) tire. After replacement of a wheel or tire, assignment or re-assignment of the sensor signals to the positions on the vehicle may be necessary. Such assignment can be carried out manually, for example, by using a Low-Frequency (LF) initializer, which is used to initialize each individual sensor upon indication from a system receiver. The initialization can be affected by sequentially activating an LF-initiator in the proximity of the respective sensor and receiving an according response with a unique identification from the sensor.

Some known TPMS systems utilize multiple LF-initializers, e.g. in terms of transmitter coils or inductors, for initialization of each individual sensor or wheel, for example, and they can be mounted in the wheel housing of each wheel. The number of involved LF-initializers may render such an approach uneconomic. Other concepts make use of different reception levels of the LF-radio signals using transmitter coils at different locations asymmetric to the wheels, e.g. one in the front and one in the back. These concepts are expensive and unsuitable for after-market installation. Further concepts make use of the varying reception power of the RF-signals transmitted by the sensors. The reception power of such an RF-signal can be measured and the different locations can be distinguished by the different reception levels, e.g. evoked by different distances of the wheels. The larger the distance between a wheel and the corresponding receiver the lower the reception power. In some cars a distinction between the signals from the front and the signals from the back is possible, as the receiver is located at an asymmetric position i.e. close to a rear axis, a distinction between signals from the left and right is rather difficult. This concept may suffer from the complex propagation paths of the wireless signals, which may render an assignment of a reception level of a signal to a certain wheel difficult. Some concepts may use a set of acceleration sensors, which are installed in an orthogonal manner in each wheel to determine the rotational direction of the wheels to distinguish left and right wheels.

Another concept uses ABS (Anti-lock Braking System) signals to determine rotational frequencies of the wheels and relates or correlates them to rotational frequencies determined based on TPMS signals, which may make use of radial acceleration sensors determining the acceleration changes as the sensor rotates with the wheel causing centrifugal acceleration on top of gravitation.

SUMMARY

Embodiments are based on the finding that Original Equipment Manufacturers (OEMs) indicate a desire for a robust, cheap/cost efficient and an energy efficient localization concept up to maximum speed, such as up to 300 km/h. It is a further finding that existing localization concepts can have limitations regarding maximum speed, costs and energy efficiency. For example, when acceleration sensors are used to determine the rotational speed of a wheel, the occurring accelerations depend on the rotational speed of the wheel. However, the relation can be of a quadratic nature, i.e. doubling the rotational speed of a wheel corresponds to four times the radial acceleration. Therefore, radial acceleration sensors may be limited at higher speeds. It is a further finding of embodiments that a tangential acceleration may as well be exploited to determine a rotational speed of a wheel. Moreover, it is another finding that the tangential acceleration does not grow in a quadratic manner with the rotational speed of a wheel. Embodiments therefore exploit the tangential acceleration of a wheel in order to determine a rotational speed or frequency of the wheel.

Embodiments may therewith provide the advantage that tangential acceleration sensors, which are also referred to as X-sensors, may not have a speed limitation such as at least some of the radial acceleration sensors. As the acceleration does not grow as vastly as for radial acceleration sensors, the tangential acceleration sensors may be used up to much higher rotational frequencies and therewith up to higher vehicle speeds. Embodiments may therewith provide localization concepts which are efficient and may have a high or even no speed limitation.

Embodiments are further based on a finding that a tangential acceleration sensor may measure an accurate vehicle speed without absolute acceleration information, which may be based on a calibration process in manufacturing for a wide range speed. Moreover, a tangential sensor may not have a direct current (DC) offset of sinusoidal signals to detect an Angular Position of a Sensor (APS) and it may enable a cost and energy efficient concept. Furthermore, tangential acceleration determination may provide the advantage that temperature compensation and a calibration may not be needed for an acceleration measurement, since relative measurements may be sufficient for determining a rotational speed of a wheel.

Embodiments make use of information related to a tangential acceleration of at least one wheel of a vehicle. In the following a vehicle can be any vehicle using tires, as for example, a car, a van, a truck, a bus, a plane, a bike, a motorbike, etc. Although many embodiments will be exemplified using a car, any other vehicle can be utilized in embodiments. Embodiments provide a system for locating a position of at least one out of a plurality of wheels of a vehicle. The system comprises a detector which is configured to obtain information related to a tangential acceleration of the at least one wheel of the vehicle. It is a finding of embodiments that the tangential acceleration of a wheel of a vehicle provides an oscillating signal as the wheel rotates in gravity. Moreover, the tangential acceleration is not as significantly affected by different rotational speeds of the wheel as a radial acceleration, as will be detailed subsequently. In embodiments, the detector can be implemented as any means for detecting, a detection device, a detection unit, a detection module, one or more sensors, etc.

The system further comprises an antilock braking system unit configured to obtain information related to angular rotations of the plurality of wheels. In embodiments the antilock braking system unit may be implemented as any means for antilock braking, an antilock brake device, an antilock brake module, and it may comprise antilock braking system sensors or detectors as will be detailed in the sequel. In other words, from an antilock braking system, angular rotations of the plurality of wheels can be determined.

The system further comprises a locator configured to determine the position of the at least one wheel based on the information related to the tangential acceleration of the at least one wheel and the information related to the angular rotations of the plurality of wheels. The locator can be implemented as any locating means, such as a locating device, a locating unit, a locating module, software which is executed on accordingly-adapted hardware, such as a processor, a digital signal processor (DSP), a multipurpose processor, a controller, etc. In other words, the locator may exploit knowledge on the angular rotations of the plurality of wheels on the vehicle as obtained from the antilock braking system and it may compare these angular rotations to an angular rotation determined from the information related to the tangential acceleration of the at least one wheel. Therewith, the finding may be exploited that from the tangential acceleration, information related to an angular frequency or rotational speed of the wheel can be derived.

By matching the angular rotations determined from the tangential accelerations with the angular rotations from the antilock braking system, signals with corresponding rotational frequencies can be assigned to each other. Since the positions of the wheels evoking the antilock braking system angular rotations are known, the locator can determine the position of the at least one wheel based on the respective position information from the antilock braking system. In other words, the locator can be configured to obtain the position of the at least one wheel further based on predetermined positions associated to the plurality of wheels and the information related to the angular rotations of the plurality of wheels.

In further embodiments, the detector can comprise an acceleration sensor for sensing information related to the tangential acceleration of the at least one wheel of the vehicle. The acceleration sensor may correspond to an X-sensor mounted on the wheel. In embodiments such a tangential acceleration sensor may be mounted on the tire or on the rim of the wheel. The acceleration sensor may correspond to a one-dimensional sensor, for example, a sensor sensing the tangential acceleration or any other acceleration, from which a tangential acceleration can be determined. In some embodiments, the acceleration sensor can correspond to a linear sensor; however, utilization of non-linear sensors in embodiments is also conceivable. Embodiments may not depend on the exact tangential accelerations, but on tangential acceleration changes, from which information related to the angular rotations of the wheel is derivable.

In further embodiments, the locator can be configured to determine the position of the at least one wheel by determining information related to a correlation of the information related to tangential acceleration of the at least one wheel and the information related to the angular rotations of the plurality of wheels of the vehicle. In other words, in some embodiments the locator may determine a correlation between angular rotations determined based on an antilock braking system and angular rotations determined based on the tangential acceleration of a wheel. Determining the correlation may correspond to determining any measure on how the different angular rotations match each other. For example, once an angular rotation is derived from the tangential acceleration of the at least one wheel, the wheel can be assigned to the position for which the antilock braking system unit indicates an angular rotation of the respective wheel closest to the angular rotation determined from the tangential acceleration.

In further embodiments, the antilock braking system unit may comprise one or more antilock braking system sensors to obtain the information related to the angular rotations of the plurality of wheels. There are several possibilities for these antilock braking system sensors. For example, indicators may be mounted on the rim, which can be sensed from the chassis of the vehicle as the wheel rotates. Such indicators may be optical indicators, magnetic indicators, electrical indicators, etc. The sensors may then correspond to optical sensors, magnetic sensors, electrical sensors, etc. In some embodiments, one implementation may use a rotating plate or a disc, having correspondingly adapted gaps through which an optical signal can be obtained. As the antilock braking system has this sensor assigned to a certain position, it is already known from which position on the vehicle the angular rotation is measured by the antilock braking system.

In further embodiments, the detector can be configured to obtain information related to a tire pressure of the at least one wheel. The locator can be further configured to associate the information related to the tire pressure with the position of the at least one wheel. In other words, once the position of the wheel has been determined, a tire pressure signal, as for example determined by a pressure sensor from a Tire Pressure Monitoring System (TPMS), can also be assigned to that position. In some embodiments, information related to the tire pressure and information related to the tangential acceleration of the respective wheel may be communicated using the same signal. Furthermore, the signal may comprise an IDentification (ID), for example, in terms of a unique number assigned to the respective TPMS-sensor. Therefore, the respective tire pressure can be assigned to the location or position as determined by the above method. That is to say in some embodiments the detector may further comprise a tire pressure sensor. In some embodiments a tire pressure sensor and a tangential acceleration sensor may be integrated into one device, wherein the device or combined sensor is also operable to provide according measurement results on the tangential acceleration and the tire pressure in one signal.

In further embodiments the detector and the locator can be configured to communicate in a wireless manner. In other words, radio signals may be used to communicate the respective information from the detector to the locator. The detector can be configured to transmit information using a radio signal and the locator can be configured to receive information from the radio signal. For example, some embodiments may use low-frequency radio signals for transmitting the information. In embodiments, any short range wireless communication standard or system may be used to communicate the information from the detector to the locator. For example, any near field communication may be used, such as radio frequency identification (RFID), Zigbee, Bluetooth, etc. Hence, in some embodiments the detector may comprise typical transmitter components, such as a transmit antenna or loop, an amplifier, a filter, a mixer, an oscillator, etc. Correspondingly the locator may comprise typical receiver components such as a receive antenna or loop, an amplifier, a filter, a mixer, an oscillator, etc.

In line with the above description, embodiments may provide a wheel localizer for locating a position or a location of at least one out of a plurality of wheels of a vehicle. The wheel localizer comprises a detector configured to provide an acceleration signal, comprising information related to a tangential acceleration of the at least one wheel of the vehicle. Moreover, the wheel localizer comprises an antilock braking system unit configured to provide a rotation signal comprising information related to angular rotations of the plurality of wheels. Furthermore, the wheel localizer comprises a locator configured to receive the acceleration signal and the rotation and being further configured to provide a position signal comprising information related to the position of the at least one wheel based on the acceleration signal and the rotation signal.

In other words, the wheel localizer may be implemented as one or more chips or integrated circuits. The detector may provide the acceleration signal and the antilock braking system unit may provide the rotation signal. The locator may then determine an expected rotation signal for the at least one wheel from the acceleration signal and compare the expected rotation signal with the rotation signal from the antilock braking system unit.

In embodiments, the locator can be configured to provide the position signal further based on predetermined positions associated to the plurality of wheels and the information related to the angular rotations of the plurality of wheels. In other words, as it was described above, the antilock braking system unit may have predetermined knowledge on which angular rotation relates to which one of the plurality of wheels. Using the predetermined knowledge on the position of the wheel with the certain angular rotation, this angular rotation can be matched to the above expected angular rotation and thus the position can be assigned.

In embodiments the detector may comprise an acceleration sensor for sensing information related to the tangential acceleration of the at least one wheel of the vehicle. As it was explained above, the acceleration sensor may be mounted on the rim or the tire of the wheel. In embodiments, the acceleration sensor may correspond to a one-dimensional sensor and/or a linear sensor. The locator can be configured to determine the information related to the position of the at least one wheel by determining information related to a correlation of the information related to the tangential acceleration of the at least one wheel and the information related to the angular rotations of the plurality of wheels of the vehicle. As described above, correlations may be determined between rotational signals from the antilock braking system and the acceleration signal directly, or an expected rotational signal may be determined from the acceleration signal which can be used for the correlation. In line with the above description, the antilock braking system unit may comprise one or more antilock braking system sensors to obtain the rotation signal. The locator can be further configured to receive a pressure signal comprising information related to a tire pressure of the at least one wheel. The locator can be further configured to associate the information related to the tire pressure with the position signal, i.e. with the position as determined from the angular rotation and the expected angular rotation. Furthermore, the detector can be further configured to transmit information using a radio signal and the locator can be further configured to receive the information from the radio signal in line with the above.

Embodiments further provide a wheel localization device for locating a position of at least one out of a plurality of wheels of a vehicle. The wheel localization device comprises one or more inputs for a first signal comprising information related to a tangential acceleration of the at least one wheel of the vehicle and for one or more second signals comprising information related to angular rotations of the plurality of wheels. The wheel localization device further comprises an output for an output signal comprising information related to the position of the wheel, wherein the output signal is based on the first signal comprising the information related to the tangential acceleration of the at least one wheel of the vehicle and on the one or more second signals comprising the information related to the angular rotations of the plurality of wheels.

In embodiments, the wheel localization device may be implemented as one or more chips or integrated circuits. In some embodiments, the wheel localization device may correspond to one of the above systems on one chip. For example, the wheel localization device may be implemented as an Application Specific Integrated Circuit (ASIC). In embodiments, the output signal may comprise information related to an association of the first signal to one of the angular rotations of the plurality of wheels. In other words, in some embodiments the wheel localization device may provide information to which one of the angular rotations from the plurality of wheels the respective tangential acceleration is associated. The final localization, for example, the assignment of the position of certain angular rotation to the tangential acceleration may be carried out outside the wheel localization device.

Embodiments also provide a method for locating a position of at least one out of a plurality of wheels of a vehicle. The method comprises obtaining information related to a tangential acceleration of the at least one wheel of the vehicle and obtaining information related to angular rotations of the plurality of wheels. The method further comprises determining the position of the at least one wheel based on the information related to the tangential acceleration of the at least one wheel and the information related to the angular rotations of the plurality of wheels in line with the above description.

In further embodiments, the method may further comprise determining the position of the at least one wheel by determining information related to a correlation of the information related to the tangential acceleration of the at least one wheel and the information related to the angular rotations of the plurality of wheels of the vehicle. Hence, in line with the above description, embodiments may carry out a correlation between the tangential acceleration and the angular rotations. In further embodiments, the method may further comprise obtaining information related to a tire pressure of the at least one wheel and associating the information related to the tire pressure with the position of the at least one wheel. Moreover, in embodiments, the method may comprise transmitting information using a radio signal and receiving the information from the radio signal as described above.

Embodiments further provide a computer program having a program code on a non-transitory medium for performing, when the computer program is executed on a computer or on a processor, a method for locating a position of at least one out of a plurality of wheels of a vehicle, as described above.

Embodiments can be further based on the finding that any sensor system, which is located in a wheel, may be battery powered. When having battery powered devices, energy efficient operation may be desirable. It is a further finding that some wheel sensing systems use the radial acceleration in order to determine whether the system or wheel is in motion or not. If low or no radial acceleration is determined, the system may be switched into a standby mode, i.e. into an energy efficient mode. It is a further finding of embodiments that a more efficient utilization of such a system can be achieved if an actual acceleration is stored in a memory. With the stored value, the system can wake up and measure another acceleration. If the acceleration does not change or does not change more than a certain threshold, the system may go to the standby or energy efficient mode. If changes in the acceleration are detected, the system may be switched into measurement mode or run mode.

Embodiments provide a system for determining an acceleration of a wheel of a vehicle. The system comprises an acceleration sensor configured to determine information related to an acceleration of the wheel. In embodiments, the acceleration sensor can be implemented as any one- or multi-dimensional sensor, which can be linear or non-linear. The system further comprises a memory unit configured to store information related to the acceleration of the wheel. The memory can be any memory, such as a Random Access Memory (RAM), an Electronically Erasable Programmable Read-Only Memory (EEPROM), etc. The memory can, for example, be battery powered as well; it may be versatile or non-versatile. The system may further comprise a control unit which can be implemented as a control device, a control module, a controller, any means for controlling, a processor, a microprocessor, etc.

The control unit is configured to compare stored information related to a past acceleration of the wheel with recent information related to a recent acceleration of the wheel, where the control unit is configured to operate the system in a standby mode when the stored information differs from the recent information by less than a predetermined threshold. In other words, accelerations may be measured at different times. A measurement at the first time is stored in the memory. At a certain time later, a second measurement is taken and compared to the first measurement. If the difference between the two measurements lies below the threshold, which can be set in a predetermined way, the system is operated in standby mode. If acceleration changes are detected, the system can be switched into a measurement mode and provide more frequent measurements than in the standby mode. The time period between the first time and the second time, i.e. the wake-up settings for the above comparisons, may be preset as well. Hence, the wake-up intervals in standby mode can be adjusted and therewith the corresponding energy consumption.

Embodiments may further provide an according method for determining an acceleration of a wheel of a vehicle. The method comprises determining information related to an acceleration of the wheel and storing information related to the acceleration of the wheel. The method further comprises comparing stored information related to a past acceleration of the vehicle with recent information related to a recent acceleration of the wheel. The method further comprises operating the system in a standby mode when the stored information differs from the recent information by less than a predetermined threshold.

Embodiments may further provide a computer program having a program code on a non-transitory medium for performing, when a computer program is executed on a computer or on a processor, a method for determining an acceleration of a wheel of a vehicle according to the above description.

Embodiments may provide the advantage that higher speed limits for localization systems and sensors may be enabled using tangential acceleration for localization concepts. Moreover, more cost-effective sensors may be used, as tangential sensors may not need to be calibrated in order to determine the rotational speed of the wheel. Moreover, using one of the above concepts, a sinusoidal signal may be used to detect an angular position of a sensor, which may have only a low or even no DC offset. Furthermore, temperature compensation and calibration may not be needed for acceleration measurements in embodiments. Embodiments may only make use of relative measurements.

BRIEF DESCRIPTION OF THE DRAWINGS

Some other features or aspects will be described using the following non-limiting embodiments of apparatuses and/or methods and/or computer programs by way of example only, and with reference to the accompanying Figures, in which

FIG. 9 illustrates different tangential accelerations in an embodiment;

DETAILED DESCRIPTION

Various embodiments will now be described in more detail with reference to the accompanying drawings. In the Figures, the thicknesses of lines, layers and/or regions may be exaggerated for clarity.

Accordingly, while embodiments are capable of various modifications and alternative forms, embodiments thereof are shown by way of example in the Figures and will herein be described in detail. It should be understood, however, that there is no intent to limit embodiments to the particular forms disclosed, but on the contrary, embodiments are to cover all modifications, equivalents, and alternatives falling within the scope of the invention.

Like numbers refer to like or similar elements throughout the description of the Figures. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description some components will be displayed in multiple Figures carrying the same reference signs, but may not be described multiple times in detail. A detailed description of a component may then apply to that component for all its occurrences.

Figure 1:
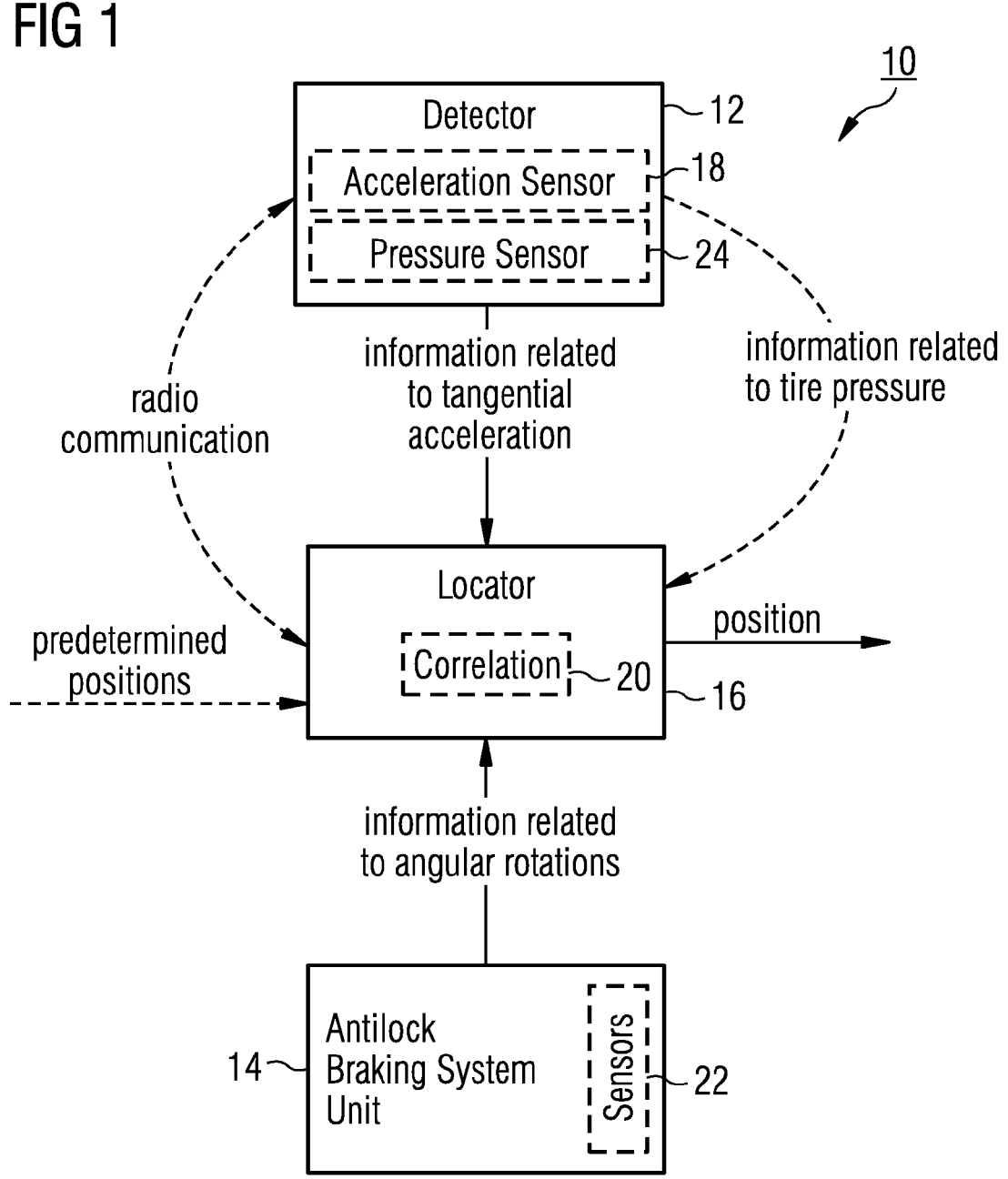
FIG. 1 shows an embodiment of a system for locating a position of a wheel.

FIG. 1 shows an embodiment of a system 10 for locating a position of at least one out of a plurality of wheels of a vehicle. The system 10 comprises a detector 12 configured to obtain information related to a tangential acceleration of the at least one wheel of the vehicle. The system 10 further comprises an antilock braking system unit 14 configured to obtain information related to angular rotations of the plurality of wheels. The system 10 further comprises a locator 16 configured to determine the position of the at least one wheel based on the information related to the tangential acceleration of the at least one wheel and the information related to the angular rotations of the plurality of wheels. FIG. 1 further shows the detector 12 is coupled to the locator 16. Furthermore, the antilock braking system unit 14 is coupled to the locator 16.

Optional features are indicated by dashed lines or boxes in the following Figures. As FIG. 1 further indicates the locator 16 can be configured to obtain the position of the at least one wheel further based on predetermined positions associated with the plurality of wheels and the information related to the angular rotations of the plurality of wheels. As further indicated in FIG. 1, the locator 16 can be configured to determine the position of the at least one wheel by determining information related to a correlation of the information related to the tangential acceleration of the at least one wheel and the information related to the angular rotations of the plurality of wheels of the vehicle.

As further shown in FIG. 1, the detector 12 may comprise an acceleration sensor 18 for sensing information related to the tangential acceleration of the at least one wheel of the vehicle. The acceleration sensor 18 may correspond to a one-dimensional and/or a linear sensor. Moreover, the detector 12 may comprise a pressure sensor 24 such as a tire pressure sensor 24. The detector 12 can be further configured to obtain information related to a tire pressure of the at least one wheel and hence the locator 16 can be further configured to associate the information related to the tire pressure with the position of the at least one wheel. FIG. 1 further shows the optional sensors 22 which can be comprised in the antilock braking system unit 14. The antilock braking system unit 14 may comprise one or more antilock braking system sensors 22 to obtain the information related to the angular rotations of the plurality of wheels. Finally, FIG. 1 also shows that there may be a radio communication used between the locator 16 and the detector 12. More particularly, the detector may comprise typical transmitter components such as a transmit antenna or loop, a radio frequency oscillator, a mixer, a power amplifier, etc. Correspondingly, the locator 16 may comprise typical receiver components, such as one or more receive antennas or loops, one or more filters, one or more oscillators, a low-noise amplifier, a converter, a mixer, etc.

Figure 2:
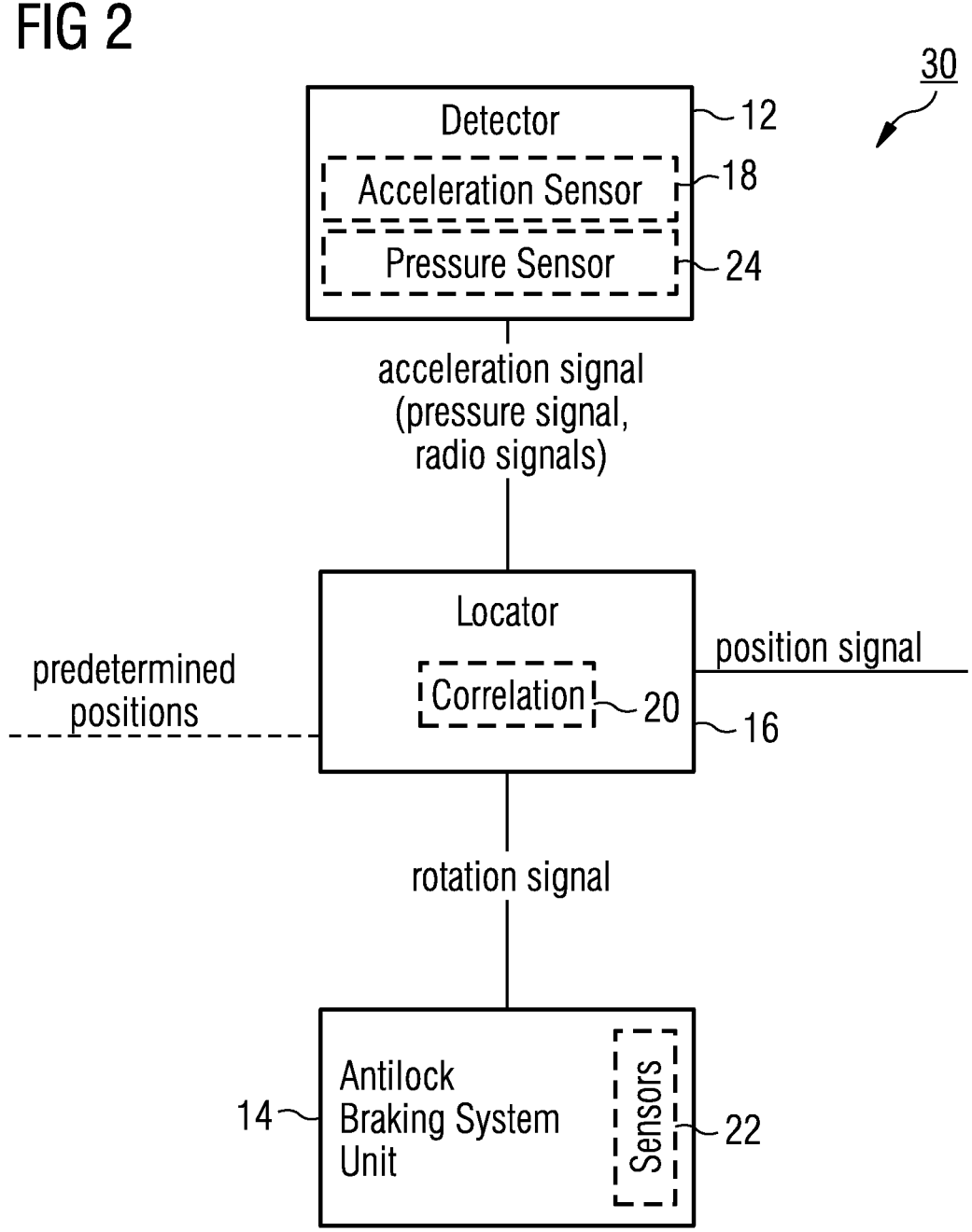
FIG. 2 shows an embodiment of a wheel localizer.

FIG. 2 illustrates an embodiment of a wheel localizer 30 for locating a position of at least one out of a plurality of wheels of a vehicle. The wheel localizer 30 comprises a detector 12 which is coupled to a locator 16. Moreover, the wheel localizer 30 comprises an antilock braking system unit 14 which is also coupled to the locator 16. The detector 12 is configured to provide an acceleration signal of the at least one wheel of the vehicle to the locator 16. The antilock braking system unit 14 is configured to provide the rotation signal comprising information related to angular rotations of the plurality of wheels to the locator 16. The locator 16 is configured to receive the acceleration signal and the rotation signal and to further provide a position signal comprising information related to the position of the at least one wheel based on the acceleration signal and the rotation signal.

The locator 16 can be further configured to provide the position signal further based on predetermined positions associated with the plurality of wheels and the information related to the angular rotations of the plurality of wheels is indicated by the dashed line in FIG. 2. As also indicated in FIG. 2, the detector 12 may comprise an acceleration sensor 18, which may correspond to a one-dimensional or a multi-dimensional sensor, a linear or a non-linear sensor, respectively. The acceleration sensor 18 is configured to sense information related to the tangential acceleration of the at least one wheel of the vehicle. As further indicated in FIG. 2, the locator 16 can be configured to determine the information related to the position of the at least one wheel by determining information related to a correlation 20 of the information related to the tangential acceleration of the at least one wheel and the information related to the angular rotations of the plurality of wheels of the vehicle. Furthermore, the antilock braking system unit 14 may comprise one or more antilock braking system sensors 22 to obtain the rotation signal. The locator 16 can be configured to receive a pressure signal from the detector 12 comprising information related to a tire pressure of the at least one wheel where the locator 16 can be further configured to associate the information related to the tire pressure with the position signal. Correspondingly, the detector 12 may further comprise a pressure sensor 24 for generating the pressure signal. Moreover, the detector 12 and the locator 16 can be accordingly configured to exchange the respective information using radio signals as described above.

Figure 3:
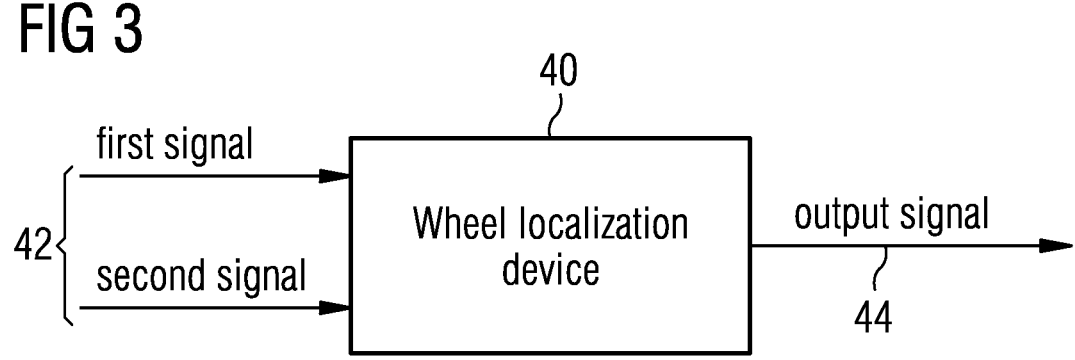
FIG. 3 shows an embodiment of a wheel localization device.

FIG. 3 illustrates an embodiment of a wheel localization device 40 for locating a position of at least one out of a plurality of wheels of a vehicle. The wheel localization device 40 comprises one more inputs 42 for a first signal comprising information related to a tangential acceleration of the at least one wheel of the vehicle and for one or more second signals comprising information related to angular rotations of the plurality of wheels. Moreover, the wheel localization device comprises an output 44 for an output signal comprising information related to the position of the wheel, wherein the output signal is based on the first signal comprising the information related to the tangential acceleration of the at least one wheel of the vehicle and on the one or more second signals comprising the information related to the angular rotations of the plurality of wheels. In further embodiments the output signal may comprise information related to an association of the first signal to one of the angular rotations of the plurality of wheels. In the present embodiment the wheel localization device is implemented as a single chip.

The above-described embodiments will now be detailed using the following further Figures. In high-end Tire Pressure Monitoring Systems (TPMS), it may be desirable for the vehicle to be aware of the locations of respective sensors, as, for example, front left, front right, rear left, rear right, to correctly indicate the location of the tire with low pressure in a TPMS display unit. This process is also referred to as tire localization in a TPMS application. A need of high-end TPMS systems can be considered as increasing compared to conventional TPMS, which have no tire position information. Hence, there is a desire for major TPMS suppliers and original equipment manufacturers to identify an inexpensive and reliable solution. One method, which can be used in embodiments, is a so-called hybrid tire location method. According to the above description in the hybrid tire localization concept, information from the wheel rotations, such as angular speed or angular position, measured by a sensor in the wheel, such as a Tire Pressure Sensor (TPS), is compared with information of wheel rotations or angular rotations measured by an ABS wheel speed sensor 22. Hence, measuring an angular position or angular speed of a TPS is part of the hybrid tire location concept. Conventional concepts may use a hybrid tire location solution with existing Z-axis, i.e. radial acceleration, sensors.

Figure 4:
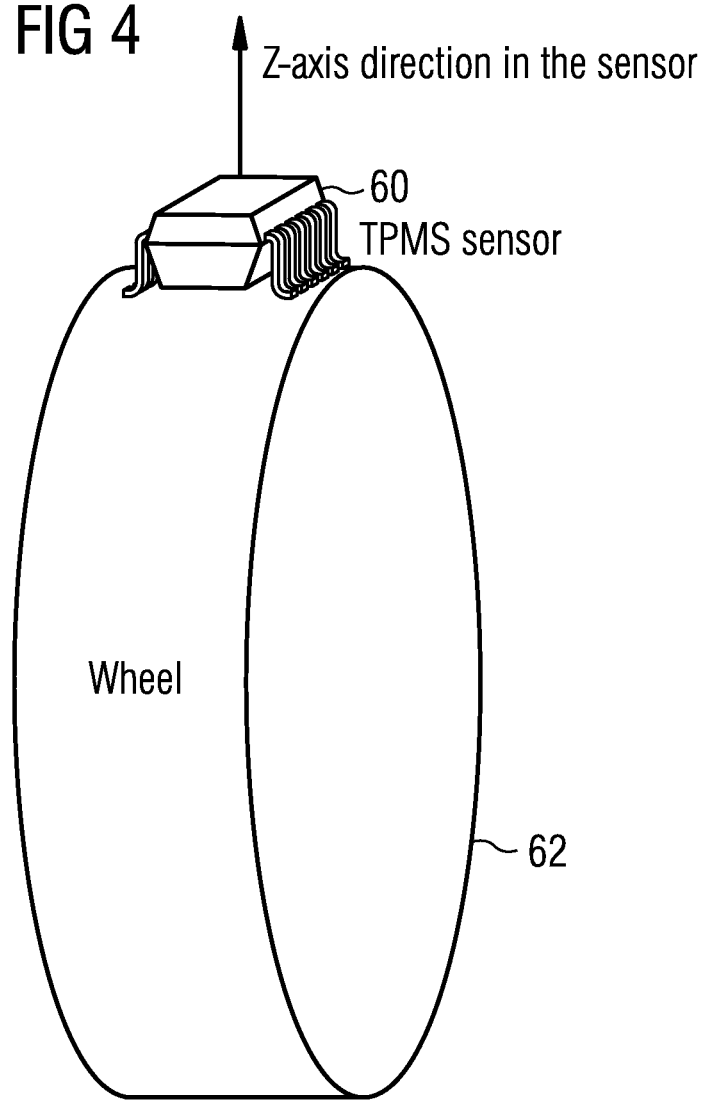
FIG. 4 illustrates a radial acceleration sensor.
Figure 5:
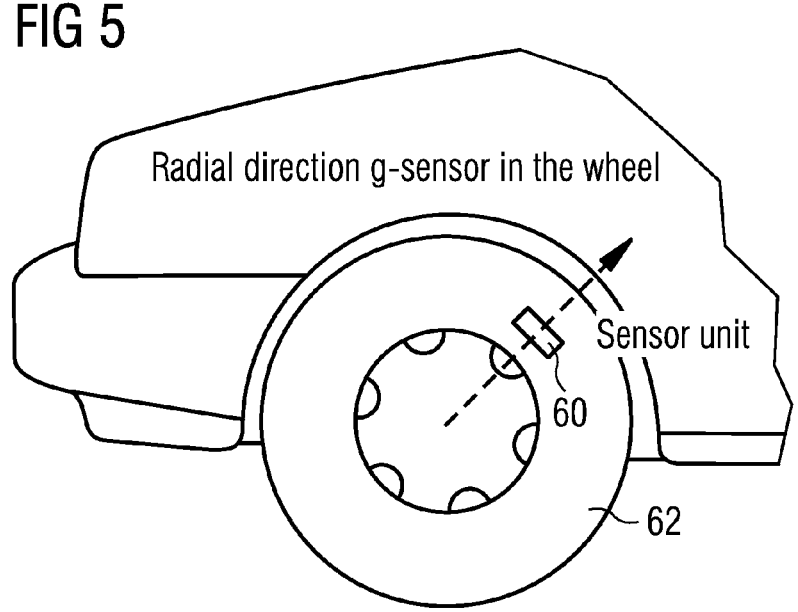
FIG. 5 illustrates a radial acceleration sensor in a vehicle.

FIG. 4 illustrates such a Z-axis sensor 60, which is mounted on a wheel 62, i.e., the rim or the tire, where the wheel 62 is shown in an idealized way in FIG. 4. The acceleration measured by this Z-axis sensor points away from the rotation axis of the wheel, i.e. radial accelerations are measured. FIG. 5 illustrates the radial acceleration sensor 60 mounted on the rim of the wheel 62, where the wheel 62 is attached to a vehicle. As the wheel starts rotating or spinning, it can be seen from FIG. 5 that a radial acceleration starts increasing. Moreover, the radial acceleration sensor is also affected by gravitation, which may take a more significant part of the overall radial acceleration when the rotation speed of the wheel 62 is rather low. FIGS. 4 and 5 illustrate the radial direction acceleration measurement of conventional TPMS applications. The acceleration measured at the radial direction of the wheel 62, i.e. the Z-axis, is the superposition of mainly earth gravity and centrifugal force. The acceleration induced by earth's gravity has a sinusoidal oscillation due to wheel rotation. The acceleration induced by centrifugal force is proportional to the square of the angular speed of the wheel 62. A sinusoidal oscillation signal is mainly used to get the angular precision of TPMS by measuring the phase of the tire rotation. The centrifugal force acceleration is used for motion detection.

As it has already been mentioned above, the centrifugal force is not constant and as the wheel 62 starts rotating a time varying dynamic DC offset in a sinusoidal oscillation depending on the driving conditions is generated. Therefore, it is more complicated to calculate the phase information of the sinusoidal oscillation. This means that a more complex algorithm may be needed for determining the rotational speed or the angular rotation itself since the time varying dynamic DC offset has to be compensated. Therefore, embodiments may provide the advantage that less battery energy is consumed by using the tangential acceleration as will be detailed subsequently. Another option would be to wait for a stable vehicle speed, which takes more time and also consumes more battery. Embodiments may therefore provide the advantage that an according measurement for determination of an angular rotation can be determined more quickly.

To detect the threshold speed for motion detection, the radial Z-sensor may measure the absolute acceleration value to calculate the vehicle speed from a radial acceleration measurement. Measurements taken at low speeds may be disadvantageous because the radial acceleration value always includes both an acceleration of centrifugal force and an acceleration of gravity. A speed measurement from a radial Z-sensor may therefore only be useful when the acceleration of the centrifugal force becomes dominant compared to the acceleration of gravity in total radial direction acceleration.

Furthermore, a Z-sensor, i.e. a radial acceleration sensor may saturate at high speeds. For example, radial acceleration at 200 km/h could reach up to 500 g. The Z-sensor may also need to have a resolution below 1 g to measure the small sinusoidal oscillation in a radial acceleration for APS. Therefore, radial acceleration sensors may have a speed limitation. On top of that, as pointed out above, the dynamic range of an Analog/Digital Converter (ADC) may need to be very high. Moreover, a high DC offset on a small AC signal may be observed. The calibration process of such a radial sensor may be rather expensive. Moreover, there may be a low speed detection limit as well.

Figure 6:
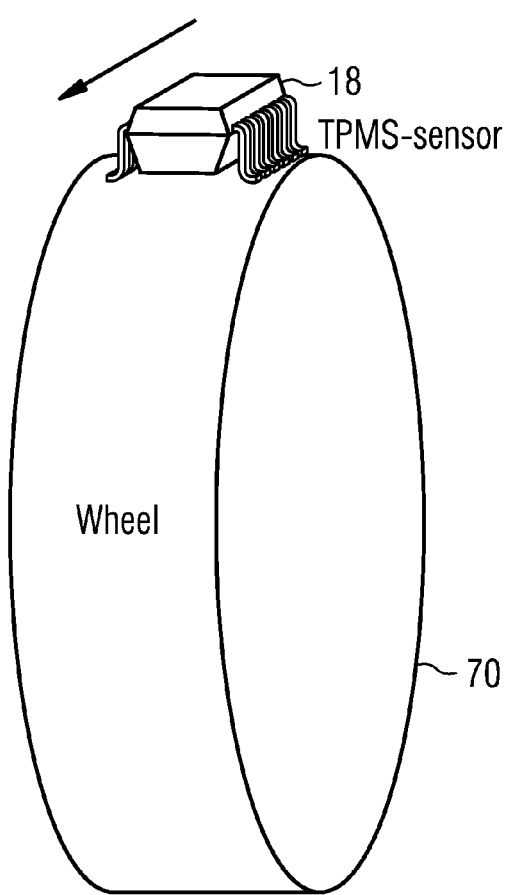
FIG. 6 illustrates a tangential acceleration sensor.
Figure 7:
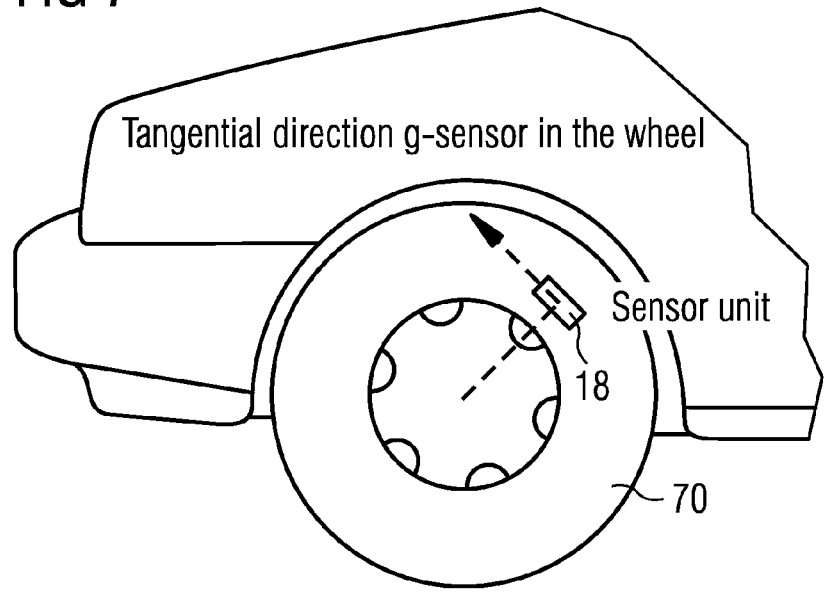
FIG. 7 illustrates a tangential acceleration sensor in a vehicle.

FIG. 6 illustrates an embodiment with an X-axis direction in the sensor, i.e. with a tangential acceleration sensor 18. FIG. 6 shows the acceleration sensor 18 mounted on the wheel 70, where the wheel is shown in an idealized way. As indicated by the arrow next to the tangential acceleration sensor, accelerations in the tangential direction are measured by this sensor. FIG. 7 illustrates the wheel 70 with the tangential sensor 18 as mounted on a vehicle. In this embodiment, the tangential acceleration sensor 18 corresponds to a tangential direction g-sensor in the wheel 70. Embodiments may use such an X-sensor for APS measurements. Embodiments may therefore provide the advantage that there is no or a high speed limitation as no or almost no radial acceleration on the X-sensor is measured. Ideally, the tangential acceleration may not be affected at all by radial acceleration because of the orthogonality between these two accelerations. Embodiments using the X-sensor APS may be more energy efficient, since they may not have a DC offset. The absence of the DC offset, or the enablement of a rather simple cancellation algorithm for the DC offset, may enable a much faster APS algorithm and embodiments may enable to utilize less APS drives due to the higher accuracy of phase angles. This may be due to tangential sensors having a higher resolution as compared to radial sensors. Also embodiments may make use of a smaller Analog/Digital Converter (ADC) range which may also enable a smaller Die or Chip size and may provide more cost efficient ASIC concepts. The wheel speed and numbers of rotation and angular acceleration can be obtained by measuring the X-sensor frequency.

Figure 8:
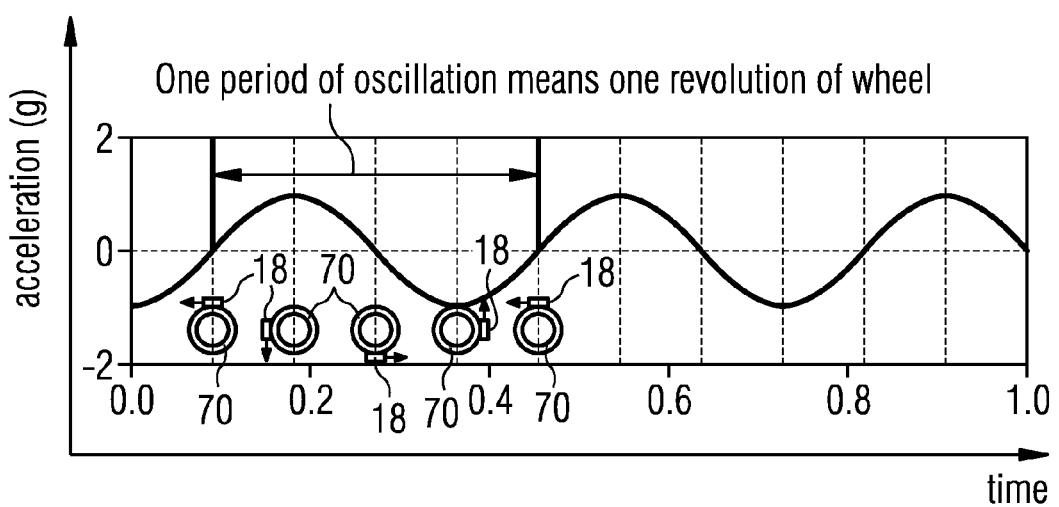
FIG. 8 depicts a view graph of an acceleration signal in an embodiment.

The speed of the vehicle $v = 2\pi f R$, where f=the frequency of wheel rotation and R=the radius of the tire. FIG. 8 illustrates a view chart showing the oscillation in gravitational acceleration g as measured with the tangential acceleration sensor 18 versus time. FIG. 8 also depicts a series of subsequent orientations of the wheel 70 with the acceleration sensor 18 measuring the acceleration as depicted at the bottom. Between the two bars in FIG. 8 there is one period of oscillation, i.e. one revolution of the wheel. In the first position, the acceleration sensor 18 is on the top of the wheel causing zero tangential acceleration. In the second position, the acceleration sensor is on the left of the wheel 70 pointing towards the ground, i.e. measuring a positive g. After that the acceleration sensor 18 is rotated to the bottom of the wheel and accordingly does not measure any tangential acceleration. In the first step, the acceleration sensor 18 is on the right-hand side of the wheel pointing upwards and accordingly measuring a negative-g acceleration. At the fifth state the acceleration sensor 18 is again at the top of the wheel 70 and does not measure any acceleration, similar to the above-described first state or position.

Embodiments may provide the advantage that an absolute value of acceleration may not be needed because the frequency information as shown in FIG. 8 is not affected significantly by the error from the absolute value of acceleration. The frequency information in the tangential acceleration signal represents the angular rotation of the wheel, as shown in FIG. 8. Therefore, a tangential sensor may not need a calibration process, rendering embodiments more efficient than conventional concepts using a radial acceleration sensor. Embodiments may provide the advantage that the used tangential acceleration sensor may not have a speed limitation for a tire localization system and APS. Moreover, embodiments may allow for less battery consumption for APS due to having a reduced DC offset or even no DC offset when using a tangential acceleration sensor. Moreover, embodiments may save costs due to smaller ADC ranges and reduced calibration efforts. Moreover, especially at low speeds, an accurate speed may still be detected with the tangential acceleration sensor.

In the following a mathematical description will be provided for the different accelerations. FIG. 9 shows a simplified representation of the wheel 70 with the tangential acceleration sensor 18. FIG. 9 shows a coordinate system at the top with x-(abscissa) and z-axis (ordinate). The origin of the coordinate system is located at the center of the wheel 70 together with the rotational axis of the wheel 70. In the diagram shown in FIG. 9 at the top, r represents the radius from the center to the sensor 18. R represents the tire radius. g expresses the gravity and θ corresponds to the CounterClockWise (CCW) direction angle from the x-axis. ώ represents dω/dt, i.e. the angular acceleration where ω corresponds to dθ/dt at the angular speed. X, Z represent the vehicle coordinates, while x, z represent the sensor coordinates. Ax corresponds to the tangential direction (x-axis acceleration) and Az represents the radial direction (z-axis acceleration). The following equations show the theoretical approach showing that a DC offset, which may be induced by centrifugal force, can be removed by solving the equations of motion of tangential direction (X-sensor) and radial direction (Z-sensor). The equation of motion for an acceleration of tangential direction (Ax) and an acceleration of radial direction (Az) can be written using the following equations:

$$Ax = -g\cos\theta - r\dot\omega - R\dot\omega\sin\theta \quad (1)$$

$$Az = -g\sin\theta + r\omega^2 + R\dot\omega\cos\theta \quad (2)$$

Figure 10:
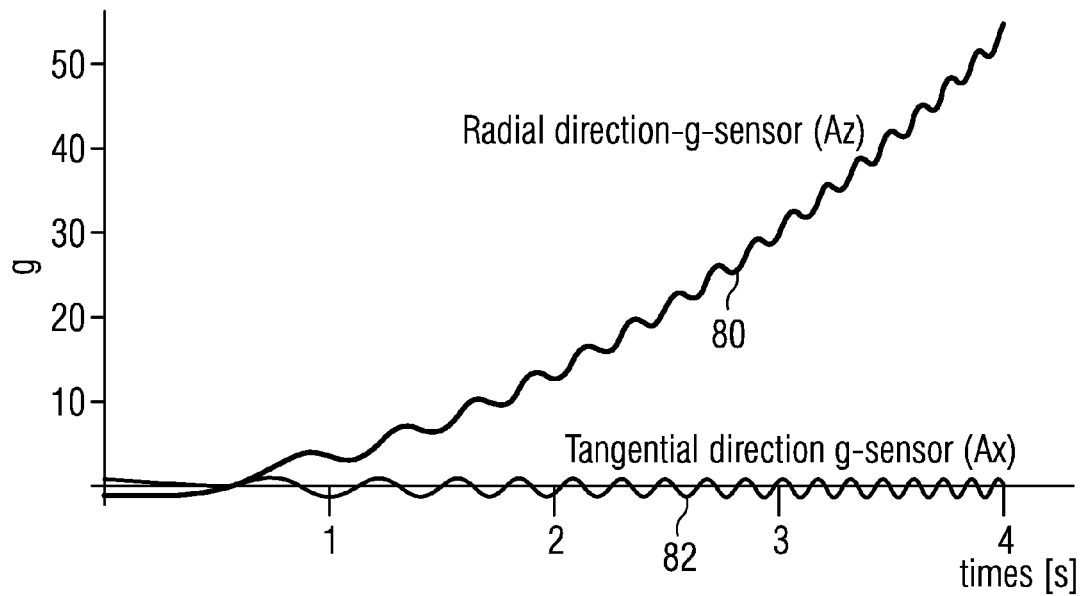
FIG. 10 shows a view chart with tangential and radial accelerations.

FIG. 10 shows another view graph which illustrates the acceleration g versus time, while it is assumed that the wheel 70 is accelerating, i.e. the rotational speed of the wheel is increasing. FIG. 10 shows two graphs 80 and 82, wherein graph 80 represents the radial direction g-sensor Az, and 82 represents the tangential direction g-sensor Ax. It can be seen from FIG. 10 the X-sensor has almost no DC offset during the acceleration compared to the Z-sensor.

The above Equation (1) represents Ax and shows a missing term $r\omega^2$ when compared with Az as given by Equation (2). The missing term constitutes the time varying DC offset. Equation (1) also shows a very important term $g\cos\theta$, which is needed to calculate the APS. The term $r\dot\omega$ is induced by tangential direction acceleration due to the angular acceleration and $R\dot\omega\sin\theta$ is induced by an acceleration of longitudinal motion from the wheel center. But these two terms $r\dot\omega$ and $R\dot\omega\sin\theta$ are very small compared to $g\cos\theta$. Therefore these two terms can be neglected in some embodiments and the two terms may only be observed in significant contribution when the wheel is accelerating or decelerating.

Figure 11:
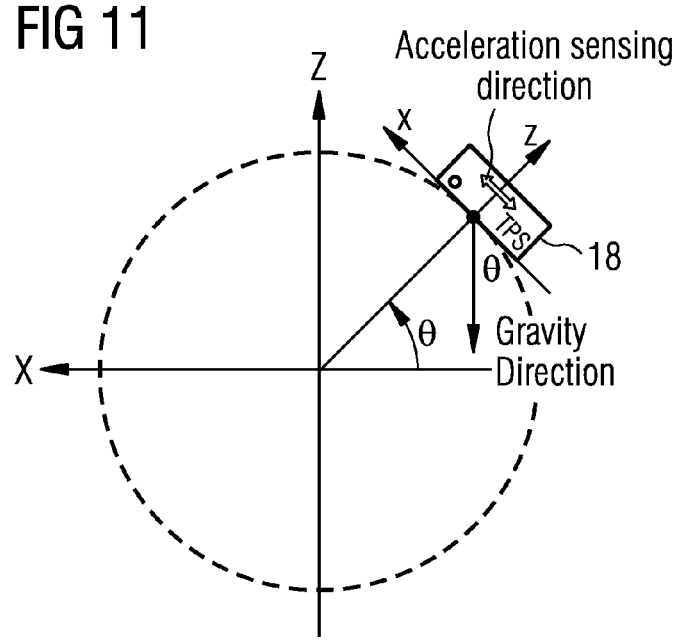
FIG. 11 shows acceleration sensing in an embodiment.

In the following a TPS with an X-axis single acceleration sensor 18 as shown in FIG. 6 will be assumed. In the present embodiment, an X-axis single acceleration sensor 18 rather than a Z-axis sensor or two-axes X/Z-sensor is used. FIG. 11 depicts another coordinate system showing the sensor 18 rotating around the origin of the coordinate system, similar to what was described with respect to FIG. 9. In the following, it will be explained how embodiments deal with the problem of energy consumption. Energy consumption is important as for most of the times the vehicle is not in motion, i.e. measuring the acceleration would consume energy which lowers the lifetime of the battery. Therefore, there is the desire to switch the sensor 18 into a standby mode when the vehicle is not in motion.

Figure 12:
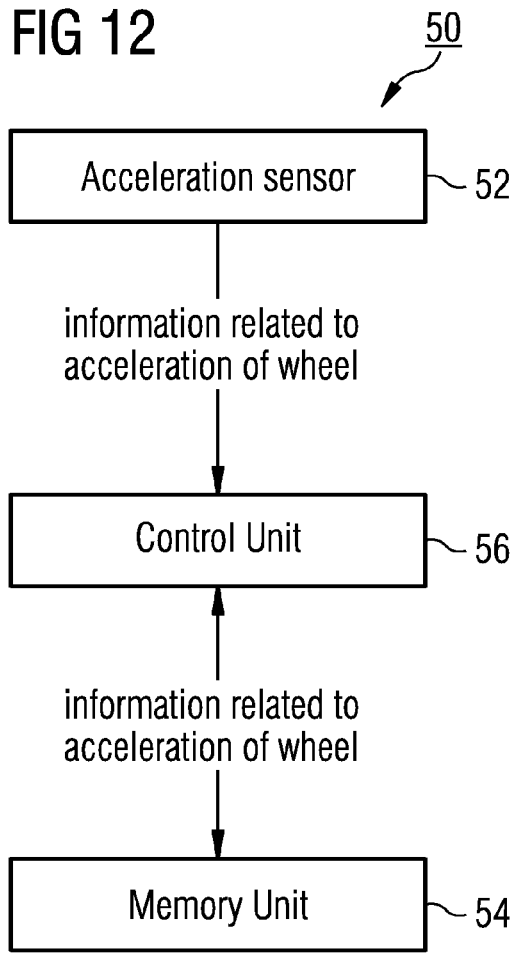
FIG. 12 depicts an embodiment of the system for determining an acceleration of a wheel of a vehicle.

FIG. 12 shows an embodiment of a system 50 for determining an acceleration of a wheel 70 of a vehicle. The system 50 comprises an acceleration sensor 52 configured to determine information related to an acceleration of the wheel 70. The system 50 further comprises a memory unit 54 configured to store information related to the acceleration of the wheel. The system 50 further comprises a control unit 56, which is configured to compare stored information related to a past acceleration of the wheel with recent information related to a recent acceleration of the wheel 70, wherein the control unit 54 is configured to operate the system 50 in standby mode when the stored information differs from the recent information by less than a predetermined threshold.

Figure 13:
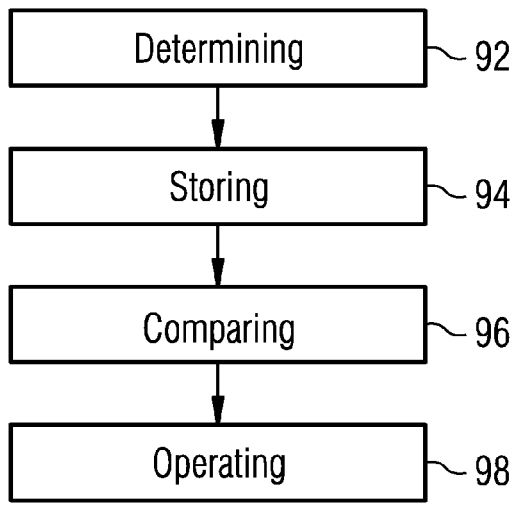
FIG. 13 shows a block diagram of a flowchart of a method for determining an acceleration of a wheel of a vehicle.

As FIG. 12 shows, the control unit 56 is coupled to the acceleration sensor 52 and a memory unit 54. The acceleration sensor 52 in this embodiment may be a tangential acceleration sensor, a radial acceleration sensor, or any one- or multi-dimensional acceleration sensor. FIG. 13 shows a block diagram of a flowchart of an embodiment of a method for determining an acceleration of a wheel 70 of a vehicle. The method comprises determining information related to an acceleration of the wheel 70 at 92 and storing information related to the acceleration of the wheel 70 at 94. Moreover, the method comprises comparing stored information related to a past acceleration of the wheel 70 with recent information related to a recent acceleration of the wheel 70 at 96. The method further comprises operating the system 50 in a standby mode when the stored information differs from the recent information by less than a predetermined threshold at 98. Embodiments may also provide a computer program for performing one of the above methods when executed on a processor or on an according hardware component. The computer program may have a program code on a non-transitory media for performing, when the computer program is executed on a computer or on a processor, the respective method.

Figure 14:
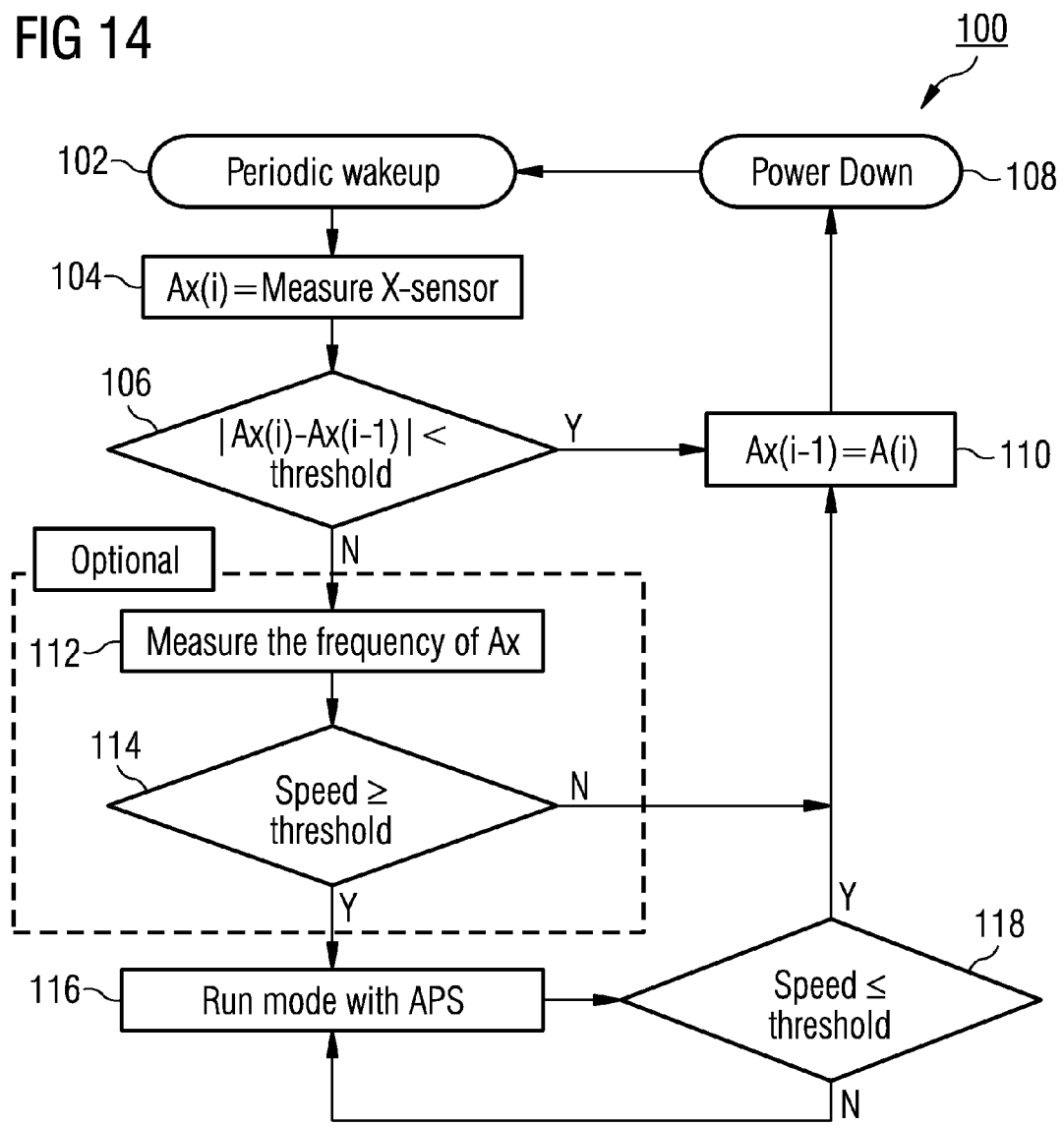
FIG. 14 shows a flowchart of another embodiment of a method for determining an acceleration of a wheel.

FIG. 14 illustrates another flowchart 100 of an embodiment of a method for determining an acceleration of a wheel 70. FIG. 14 shows 102, in which the TPS periodically wakes up to detect a vehicle motion by measuring an acceleration. Such wakeup can be carried out from a parking state of the vehicle. In conventional concepts a Z-sensor may be used to measure the radial direction acceleration. If TPS detects an acceleration of centrifugal force in parking mode, it may go into a run mode or a rolling state from parking state, figuring that a centrifugal acceleration means that the wheels are rotating and the vehicle is moving. In some embodiments, according to the above description, a single axis tangential sensor may be used as acceleration sensor, which may not be able to detect centrifugal acceleration but only the acceleration induced by earth's gravity depending on the angle position of the TPS as shown in FIG. 11. Both embodiments may make use of another concept for detecting the rolling of a wheel 70 from parking state to cover this motion detection.

As shown in FIG. 14, when a TPS goes into a stationary state or parking state, the TPS may store the later stationary g or acceleration value to a battery-powered memory unit 54 which can for example be implemented as a random access memory (RAM). In the following and in FIG. 14 this value is referred to as Ax(i−1). In the stationary state, the TPS performs a periodic wakeup to detect a motion at 102. When the TPS is woken up in the stationary step, the TPS measures one sample, which is referred to as Ax(i) as shown at 104 in FIG. 14. Then, the control unit 56, in the TPS, may compare this recent acceleration value with the stored acceleration value Ax(i−1) as stored in the RAM 54 as shown at 106 in FIG. 14. If the magnitude of Ax(i)−Ax(i−1) is less than a threshold, where some tolerance is allowed due to, for example, temperature drifts, the vehicle is very likely to be still in a stationary state. The TPS can then return to power down mode, as shown in FIG. 14 at 108, where a measurement has been carried out, just like for a radial acceleration sensor application. In some embodiments just a single measurement may be carried out. Prior to powering down at 108, the TPS may store the recent acceleration value for a future comparison as shown at 110. Hence, in case the vehicle is parked, only a small difference in energy consumption may occur compared to a radial acceleration sensor.

If Ax(i) is different from Ax(i−1), then there is a high possibility that the vehicle is moving. In this case TPS can start to measure more X-axis or tangential acceleration samples to estimate the speed by measuring the period or frequency of oscillation, as indicated at 112 in FIG. 14. Then, if the estimated speed exceeds the threshold, as shown at 114 in FIG. 14, where the threshold can be defined by the TPMS application, the TPS goes into a rolling state as indicated at 116 in FIG. 14. As indicated at 118 in FIG. 14, whenever the speed falls below the threshold, the TPS may go back to power down. As shown in FIG. 14, acts 112 and 114 are optional. In other words, an embodiment once the acceleration threshold is exceeded in step 106, the APS may switch to run mode as shown at 116 directly, without considering the speed threshold at 114. In embodiments in standby mode the system 50 or TPS may wake up frequently. The period between such wakeups can be preset, e.g. it may correspond to 1, 2, 5, 10, 20, 30, 60, 120, 240, 480 s.

Figure 15:
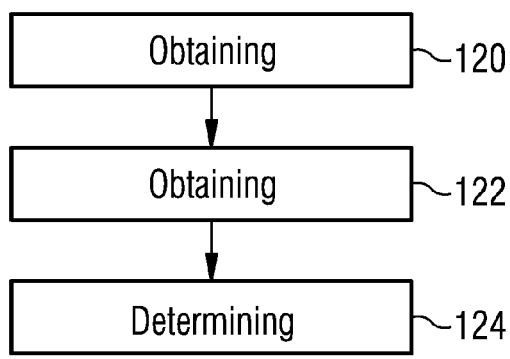
FIG. 15 illustrates a block diagram of a flowchart of an embodiment of a method for locating a position of a wheel.

FIG. 15 shows a block diagram of a flowchart of an embodiment of a method for locating a position of at least one out of a plurality of wheels of a vehicle. The method comprises obtaining information related to a tangential acceleration of the at least one wheel of the vehicle at 120 and obtaining information related to angular rotations of the plurality of wheels at 122. The method further comprises determining the position of the at least one wheel 70 based on the information related to the tangential acceleration of the at least one wheel and the information related to the angular rotations of the plurality of wheels at 124.

According to the above the method may further comprise obtaining the position of the at least one wheel further based on predetermined positions associated to the plurality of wheels and the information related to the angular rotations of the plurality of wheels. In further embodiments, the method can further comprise determining the position of the at least one wheel by determining information related to a correlation of the information related to the tangential acceleration of the at least one wheel and the information related to the angular rotations of the plurality of wheels of the vehicle. In further embodiments, the method may comprise obtaining information related to a tire pressure of the at least one wheel 70 and associating the information related to the tire pressure with the position of the at least one wheel. The method may further comprise transmitting information using a radio signal and receiving information from the radio signal in line with the above description. As mentioned before, embodiments may provide computer programs having a program code on a none-transitional media for performing, when the computer program is executed on a computer, on a processor or on corresponding hardware, one of the above-described methods.

A person of skill in the art would readily recognize that acts of various above-described methods may be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is adapted for performing or to perform a certain function, respectively. Hence, a "means for s.th." may as well be understood as a "means being adapted or suited for s.th.". A means being adapted for performing a certain function does, hence, not imply that such means necessarily is performing said function (at a given time instant).

The functions of the various elements shown in the Figures, including any functional blocks labeled as "means", may be provided through the use of dedicated hardware, such as "a processor", "a determiner", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A system for locating a position of at least one wheel out of a plurality of wheels of a vehicle, comprising:
   a detector configured to obtain information related to a tangential acceleration of the at least one wheel of the vehicle;
   an antilock braking system unit configured to obtain information related to angular rotations of the plurality of wheels; and
   a locator configured to determine the position of the at least one wheel based on the information related to the tangential acceleration of the at least one wheel and the information related to the angular rotations of the plurality of wheels, wherein the position comprises a wheel location from among the plurality of wheels.

2. The system of claim 1, wherein the locator is configured to obtain the position of the at least one wheel further based on predetermined positions associated with the plurality of wheels and the information related to the angular rotations of the plurality of wheels.

3. The system of claim 1, wherein the detector comprises an acceleration sensor for sensing information related to the tangential acceleration of the at least one wheel of the vehicle.

4. The system of claim 3, wherein the acceleration sensor comprises a one dimensional sensor or a linear sensor, or both.

5. The system of claim 1, wherein the locator is configured to determine the position of the at least one wheel by determining information related to a correlation of the information related to the tangential acceleration of the at least one wheel and the information related to the angular rotations of the plurality of wheels of the vehicle.

6. The system of claim 1, wherein the antilock braking system unit comprises one or more antilock braking system sensors configured to obtain the information related to the angular rotations of the plurality of wheels.

7. The system of claim 1, wherein the detector is further configured to obtain information related to a tire pressure of the at least one wheel and wherein the locator is further configured to associate the information related to the tire pressure with the position of the at least one wheel.

8. The system of claim 7, wherein the detector further comprises a tire pressure sensor.

9. The system of claim 1, wherein the detector is further configured to transmit information using a radio signal and wherein the locator is further configured to receive information from the radio signal.

10. A wheel localizer for locating a position of at least one wheel out of a plurality of wheels of a vehicle, comprising
    a detector configured to provide an acceleration signal comprising information related to a tangential acceleration of the at least one wheel of the vehicle;
    an antilock braking system unit configured to provide a rotation signal comprising information related to angular rotations of the plurality of wheels; and
    a locator configured to receive the acceleration signal and the rotation signal and being further configured to provide a position signal comprising information related to the position of the at least one wheel based on the acceleration signal and the rotation signal, wherein the position comprises a wheel location from among the plurality of wheels.

11. The wheel localizer of claim 10, wherein the locator is configured to provide the position signal further based on predetermined positions associated with the plurality of wheels and the information related to the angular rotations of the plurality of wheels.

12. The wheel localizer of claim 10, wherein the detector comprises an acceleration sensor configured to sense information related to the tangential acceleration of the at least one wheel of the vehicle.

13. The wheel localizer of claim 12, wherein the acceleration sensor comprises a one dimensional sensor or a linear sensor, or both.

14. The wheel localizer of claim 10, wherein the locator is configured to determine the information related to the position of the at least one wheel by determining information related to a correlation of the information related to the tangential acceleration of the at least one wheel and the information related to the angular rotations of the plurality of wheels of the vehicle.

15. The wheel localizer of claim 10, wherein the antilock braking system unit comprises one or more antilock braking system sensors configured to obtain the rotation signal.

16. The wheel localizer of claim 10, wherein the locator is further configured to receive a pressure signal comprising information related to a tire pressure of the at least one wheel, and wherein the locator is further configured to associate the information related to the tire pressure with the position signal.

17. The wheel localizer of claim 16, wherein the detector further comprises a tire pressure sensor for generating the pressure signal.

18. The wheel localizer of claim 10, wherein the detector is further configured to transmit information using a radio signal and wherein the locator is further configured to receive the information from the radio signal.

19. A wheel localization device for locating a position of at least one wheel out of a plurality of wheels of a vehicle, comprising
one or more inputs configured to receive a first signal comprising information related to a tangential acceleration of the at least one wheel of the vehicle and configured to receive one or more second signals comprising information related to angular rotations of the plurality of wheels obtained from an antilock braking system unit; and
an output configured to provide an output signal comprising information related to the position of the wheel, wherein the output signal is based on the first signal comprising the information related to the tangential acceleration of the at least one wheel of the vehicle and on the one or more second signals comprising the information related to the angular rotations of the plurality of wheels, wherein the position comprises a wheel location from among the plurality of wheels.

20. The wheel localization device of claim 19, wherein the output signal comprises information related to an association of the first signal to one of the angular rotations of the plurality of wheels.

21. A system for determining an acceleration of a wheel of a vehicle, comprising
an acceleration sensor configured to determine information related to an acceleration of the wheel;
a memory unit configured to store information related to the acceleration of the wheel; and
a control unit configured to compare stored information related to a past acceleration of the wheel with recent information related to a recent acceleration of the wheel received from the acceleration sensor, wherein the control unit is configured to operate the system in a standby mode when the stored information differs from the recent information by less than a predetermined threshold.

22. The system of claim 21, further comprising a pressure monitoring system that comprises the acceleration sensor, the memory unit, and the control unit that is in the wheel.

23. A method for locating, via a wheel localizer, a position of at least one wheel out of a plurality of wheels of a vehicle, comprising:
obtaining, via the wheel localizer, information related to a tangential acceleration of the at least one wheel of the vehicle;
obtaining, via the wheel localizer from an antilock braking unit, information related to angular rotations of the plurality of wheels; and
determining, via the wheel localizer, the position of the at least one wheel based on the information related to the tangential acceleration of the at least one wheel and the information related to the angular rotations of the plurality of wheels, wherein the position comprises a wheel location from among the plurality of wheels.

24. The method of claim 23, further comprising obtaining the position of the at least one wheel further based on predetermined positions associated with the plurality of wheels and the information related to the angular rotations of the plurality of wheels.

25. The method of claim 23, further comprising determining the position of the at least one wheel by determining information related to a correlation of the information related to the tangential acceleration of the at least one wheel and the information related to the angular rotations of the plurality of wheels of the vehicle.

26. The method of claim 23, further comprising obtaining information related to a tire pressure of the at least one wheel and associating the information related to the tire pressure with the position of the at least one wheel.

27. The method of claim 23, further comprising transmitting information using a radio signal and receiving the information from the radio signal.

28. A computer program having a program code on a non-transitory media for performing, when the computer program is executed on a computer or on a processor, a method for locating a position of at least one wheel out of a plurality of wheels of a vehicle, comprising:
obtaining information related to a tangential acceleration of the at least one wheel of the vehicle;
obtaining information related to angular rotations of the plurality of wheels; and
determining the position of the at least one wheel based on the information related to the tangential acceleration of the at least one wheel and the information related to the angular rotations of the plurality of wheels, wherein the position comprises a wheel location from among the plurality of wheels.

* * * * *